Patented Aug. 14, 1945

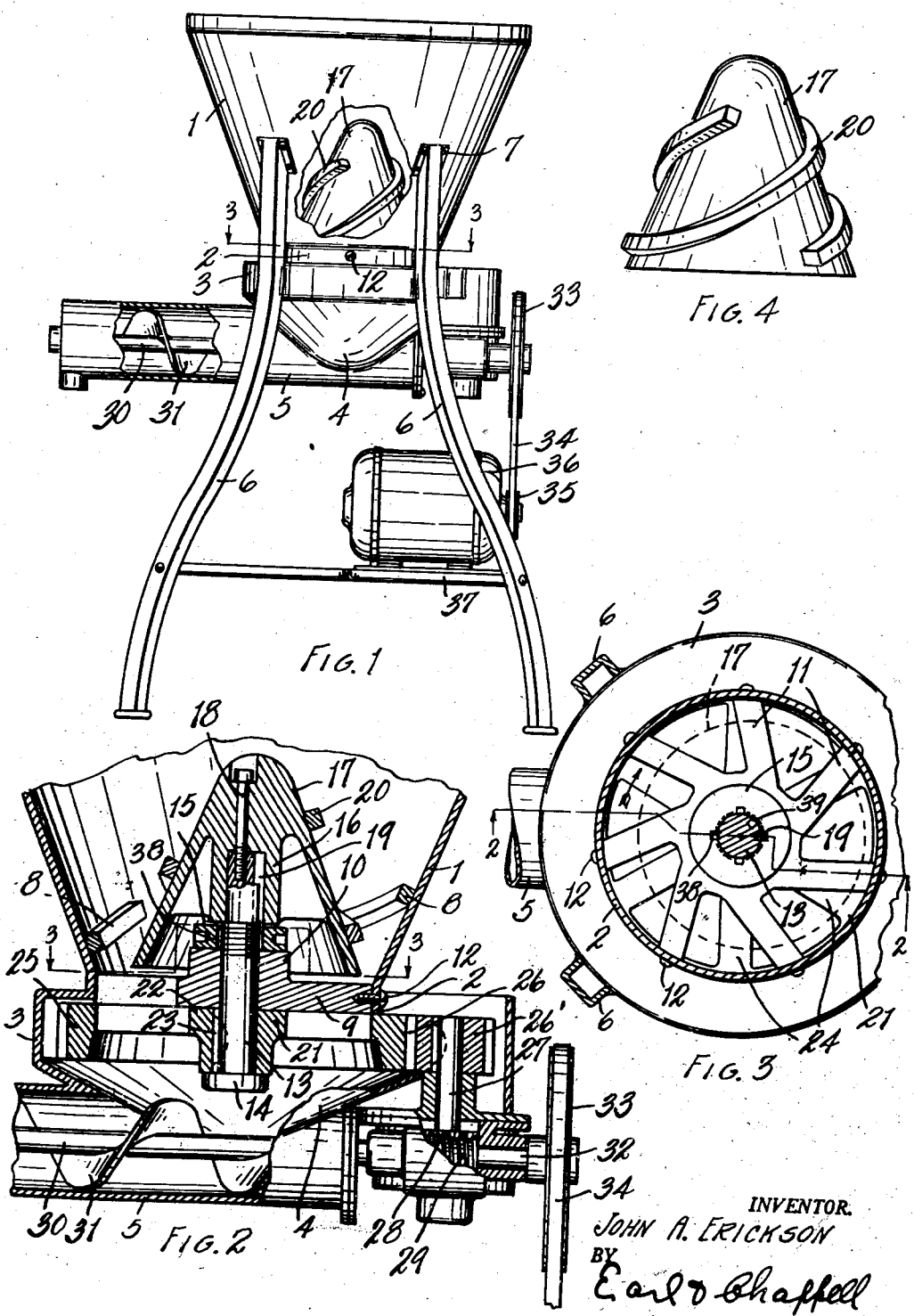

2,382,040

UNITED STATES PATENT OFFICE 2,382,040

CORN SHELLING AND SHREDDING MACHINE

John A. Erickson, Jackson, Mich.

Application August 5, 1944, Serial No. 548,228

8 Claims. (Cl. 146—74)

This invention relates to improvements in corn shelling and shredding machine.

The main objects of this invention are:

First, to provide a corn shelling and shredding machine which requires relatively little power to drive the same.

Second, to provide a machine of the class described which required little attention on the part of the operator or user.

Third, to provide a combined corn shelling and cob shredding machine which is not likely to become clogged in use.

Objects pertaining to details and economies of the invention will definitely appear from the description to follow. The invention is defined in the claims.

A structure which embodies the features of the invention is clearly illustrated in the accompanying drawing, in which:

Fig. 1 is a side elevation of a machine embodying my invention, parts being broken away to disclose structural details.

Fig. 2 is an enlarged fragmentary view mainly in section on a line corresponding to the broken line 2—2 of Fig. 3.

Fig. 3 is a fragmentary view in horizontal section on line 3—3 of Fig. 2.

Fig. 4 is a side elevation of the rotor.

In the embodiment of the invention illustrated the hopper 1 is in the form of an inverted cone having a cylindrical portion 2 at the bottom thereof. The housing 3 for certain driving connections and the cutter member, and also the conical inlet 4 of the tubular discharge chute 5, are welded together and therefore the joints are not detailed. The hopper and these parts become in effect a unitary structure.

The hopper is provided with supporting legs 6 secured thereto at 7 so that the hopper constitutes the support for the underslung parts. The hopper is provided with an internal spiral rib 8 preferably of rectangular section and terminating at its lower end adjacent the lower end of the hopper. The spider-like shear member designated generally by the numeral 9 is mounted in the cylindrical portion 2 of the hopper and comprises a central hub-like bearing 10 with shear bars 11 radiating therefrom, the ends of the shear bars being secured as by means of screws 12 to the hopper. The shear bars 11 are preferably tangentially disposed, that is, in a general tangential relation to the hub or bearing 10.

The shaft 13 is rotatably mounted in the bearing 10. The bearing is provided with an enlargement 14 at its lower end and with an adjustable thrust bearing 15 in supporting engagement with the upper end thereof. The bearing 15 is threaded upon the shaft 13. The shaft 13 projects above the thrust bearing 15 to receive the hub 16 of the conical rotor 17. This rotor is secured by the screw 18 and the key or spline 19 to the shaft, the rotor being eccentrically disposed relative to the shaft as shown by full lines in Fig. 2 and by dotted lines in Fig. 3.

The rotor is provided with a spiral rib 20 preferably of rectangular section and comprising at least two substantially complete coils or convolutions about the rotor. The upper end of the rib terminates adjacent the upper end of the rotor and the lower end adjacent the lower end of the rotor as shown in Fig. 4. The bottom of the rotor is of such diameter relative to the hopper that cobs can be discharged downwardly from the hopper. The ribs and the frictional engagement of the ears of corn with the rotor and the walls of the hopper effectively shell the corn and act to feed the same downwardly, discharging the cobs and the shelled corn through the spaces between the shear bars.

A cutter member designated generally by the numeral 21 is mounted on the lower end of the shaft and comprises the hub portion 22 which is keyed to the shaft at 23 with blades 24 radiating from the hub portion and connected at their outer ends by the rim 25. The rim is provided with gear teeth 26 so the cutter is in effect a gear, the spokes of which constitute cutters coacting with the shear bar. The shear bars being angularly disposed relative to the radial insures a draw cut action between the blades and the shear bar.

The cutter is driven by the pinion 26' mounted on the upper end of the shaft 27. On the lower end of this shaft is a worm pinion 28 with which the driving worm 29 coacts. The shaft 30 of the discharge screw 31 rotatable within the chute 5 is in alinement with the shaft 32 of the driving worm 29 and is connected thereto. The shaft 32 is provided with a pulley 33 connected by the belt 34 to the pulley 35 of the electric motor 36 which is mounted on the support 37 carried by the supporting legs.

In order to adjust the cutter in proper relation to the shear member and retain it in such adjusted position, the thrust bearing member 15 is provided with a plurality of keyways 38, four being illustrated, while the shaft is provided with at least two keyways 39 adapted to receive the feather or key 19, see Fig. 3.

With this arrangement of parts a very powerful driving connection is provided for the motor to the cutter and rotor. The structure illustrated is of a size designed to be used by farmers, one object being to provide a machine which can be operated at a very small cost and to prepare the grain as needed; that is, instead of preparing a considerable amount of grain which, unless it is thoroughly dry, is likely to result in moulding and deterioration, the machine permits preparation of the grain in batches as required. The hopper can be connected to a feed chute or otherwise provided to deliver the desired quantity, the machine set in operation, and the farmer can go about his chores or other work. The machine is strong and rigid and is not likely to become clogged. The ears of corn are fed downwardly at the proper rate and discharged to the cutter which cuts or shreds or crushes the cobs. It will be noted that the blades are not sharp in the sense of having a cutting edge, as they are designed mainly to reduce the cobs as desired with a crushing action, although there is some shearing and cutting action.

I have illustrated and described my invention in a highly practical embodiment which, as stated, is designed for individual use and to be successfully operated by a motor of small horsepower. I have not attempted to illustrate or describe other embodiments of the invention as it is believed the disclosure made will enable those skilled in the art to embody or adapt the invention as may be desired.

Having thus described my invention, what I claim as new and desire to secure by Letters Patent is:

1. A corn shelling and shredding machine comprising an inverted conical hopper provided with supporting legs and having an internal spiral rib of rectangular section terminating adjacent the lower end thereof, a spider-like shear member disposed at the bottom of the hopper and comprising a central vertical bearing and a plurality of shear bars radiating tangentially therefrom and secured at their outer ends to the wall of the hopper, a shaft disposed in said bearing and provided with a thrust bearing having threaded engagement therewith and coacting with the upper end of said bearing, a conical rotor eccentrically mounted on the upper end of said shaft and having an external spiral rib of rectangular section and comprising two substantially complete coils and terminating at its upper end adjacent the upper end of the rotor and at its lower end adjacent the lower end thereof, the ribs coacting to feed the grain downwardly and to shell the same, the lower end of the rotor being spaced from the hopper wall to permit the downward discharge of the cobs, a cutter member mounted on said shaft below said shear member and comprising a plurality of radial blades coacting with said shear bars and having a rim provided with gear teeth, a pinion coacting with said gear teeth, a shaft for said pinion provided with driven worm gear, a driving worm gear coacting with said driven worm gear, a tubular discharge chute provided with an inverted conical inlet disposed below said cutter, and a discharge screw within said chute provided with a shaft disposed in axial alinement with and connected to said driven worm gear.

2. A corn shelling and shredding machine comprising an inverted conical hopper provided with supporting legs and having an internal spiral rib of rectangular section terminating adjacent the lower end thereof, a spider-like shear member disposed at the bottom of the hopper and comprising a central vertical bearing and a plurality of shear bars radiating tangentially therefrom and secured at their outer ends to the wall of the hopper, a shaft disposed in said bearing and provided with a thrust bearing having threaded engagement therewith and coacting with the upper end of said bearing, a conical rotor eccentrically mounted on the upper end of said shaft and having an external spiral rib of rectangular section and comprising two substantially complete coils and terminating at its upper end adjacent the upper end of the rotor and at its lower end adjacent the lower end thereof, the ribs coacting to feed the grain downwardly and to shell the same, the lower end of the rotor being spaced from the hopper wall to permit the downward discharge of the cobs, and a driven cutter member mounted on said shaft below said shear member and comprising a plurality of radial blades coacting with said shear bars.

3. A corn shelling and shredding machine comprising an inverted conical hopper having an internal spiral rib terminating adjacent the lower end thereof, a shear member disposed at the bottom of the hopper and comprising a central vertical bearing and a plurality of shear bars radiating therefrom and secured at their outer ends to the wall of the hopper, a shaft disposed in said bearing, a conical rotor eccentrically mounted on the upper end of said shaft and having an external spiral rib, the ribs coacting to feed the grain downwardly and to shell the same, the lower end of the rotor being spaced from the hopper wall to permit the downward discharge of the cobs, a cutter member mounted on said shaft below said shear member and comprising a plurality of blades coacting with said shear bars and having a rim provided with gear teeth, a pinion coacting with said gear teeth, a shaft for said pinion provided with a driven worm gear, a driving worm gear coacting with said driven worm gear, a tubular discharge chute provided with an inverted conical inlet disposed below said cutter, and a discharge screw within said chute provided with a shaft disposed in axial alinement with and connected to said driven worm gear.

4. A corn shelling and shredding machine comprising an inverted conical hopper having an internal spiral rib terminating adjacent the lower end thereof, a shear member disposed at the bottom of the hopper and comprising a central vertical bearing and a plurality of shear bars radiating therefrom and secured at their outer ends to the wall of the hopper, a shaft disposed in said bearing, a conical rotor eccentrically mounted on the upper end of said shaft and having an external spiral rib, the ribs coacting to feed the grain downwardly and to shell the same, the lower end of the rotor being spaced from the hopper wall to permit the downward discharge of the cobs, and a driven cutter member mounted on said shaft below said shear member and comprising a plurality of blades coacting with said shear bars.

5. In a structure of the class described, the combination of an inverted conical hopper provided with an internal spiral rib of rectangular section, a shear member disposed at the bottom of the hopper and comprising a plurality of shear bars radiating tangentially therefrom and secured at their outer ends to the wall of the hopper, a shaft carried by said shear member, a conical rotor eccentrically mounted on the upper end of said shaft and having an external spiral rib of rectangular section and comprising two substantially complete coils and terminating at its upper end adjacent the upper end of the rotor and at its lower end adjacent the lower end thereof, the ribs coacting to feed the grain downwardly and to shell the same, the lower end of the rotor being spaced from the hopper wall to permit the downward discharge of the cobs, a cutter mounted on said shaft below said shear member and comprising a plurality of radial blades coacting with said shear bars, a tubular discharge chute provided with an inverted conical inlet disposed below said cutter, a discharge screw within said chute, and a driving means for said cutter and screw.

6. In a structure of the class described, the combination of an inverted conical hopper provided with an internal spiral rib of rectangular section, a shear member disposed at the bottom of the hopper and comprising a plurality of shear bars radiating tangentially therefrom and secured at their outer ends to the wall of the hopper, a shaft carried by said shear member, a conical rotor eccentrically mounted on the upper end of said shaft and having an external spiral rib of rectangular section and comprising two substantially complete coils and terminating at its upper end adjacent the upper end of the rotor and at its lower end adjacent the lower end thereof, the ribs coacting to feed the grain downwardly and to shell the same, the lower end of the rotor being spaced from the hopper wall to permit the downward discharge of the cobs, and a driven cutter mounted on said shaft below said shear member and comprising a plurality of radial blades coacting with said shear bars.

7. In a structure of the class described, the combination of an inverted conical hopper provided with an internal spiral rib, a shear member disposed at the bottom of the hopper and comprising a plurality of shear bars radiating therefrom and secured at their outer ends to the wall of the hopper, a shaft carried by said shear member, a conical rotor eccentrically mounted on the upper end of said shaft and having an external spiral rib, the ribs coacting to feed the grain downwardly and to shell the same, the lower end of the rotor being spaced from the hopper wall to permit the downward discharge of the cobs, and a driven cutter mounted on said shaft below said shear member and comprising a plurality of radial blades coacting with said shear bars.

8. In a structure of the class described, the combination of an inverted conical hopper having an internal spiral rib at the lower end thereof, a shear member mounted at the bottom of the hopper and comprising a central vertical bearing and a plurality of shear bars radiating therefrom, a shaft carried by said bearing, a conical rotor eccentrically mounted on the upper end of said shaft to rotate within said opening, said rotor having an external spiral rib, the ribs coacting to feed the grain downwardly and to shell the same, the lower end of the rotor being spaced from the hopper to permit the discharge of cobs, and a driven cutter member mounted on said shaft below said shear member and comprising a plurality of blades coacting with said shear bars.

JOHN A. ERICKSON.